Aug. 14, 1934.  E. PAPPERT  1,970,472
LENS STRAP FOR SPECTACLES
Filed June 17, 1933
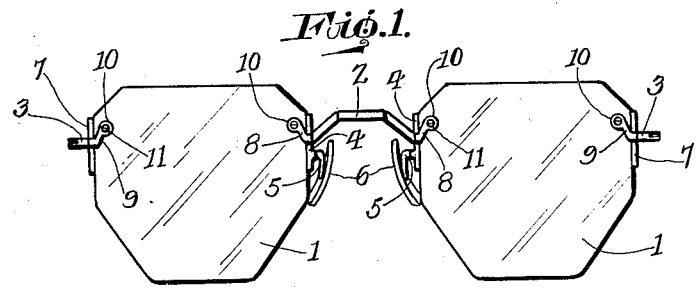
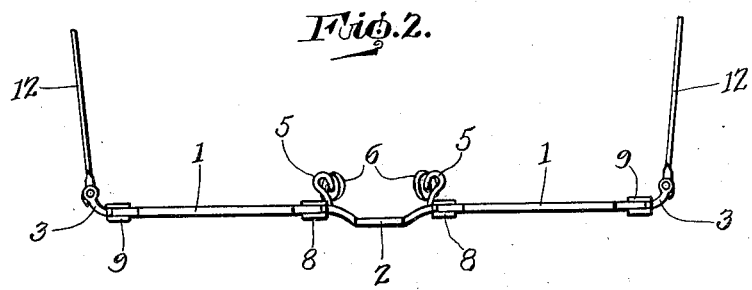
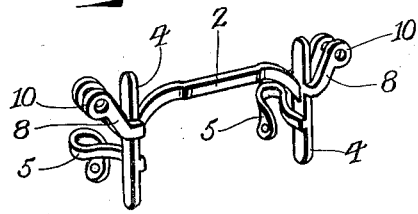
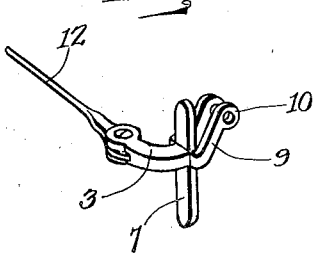
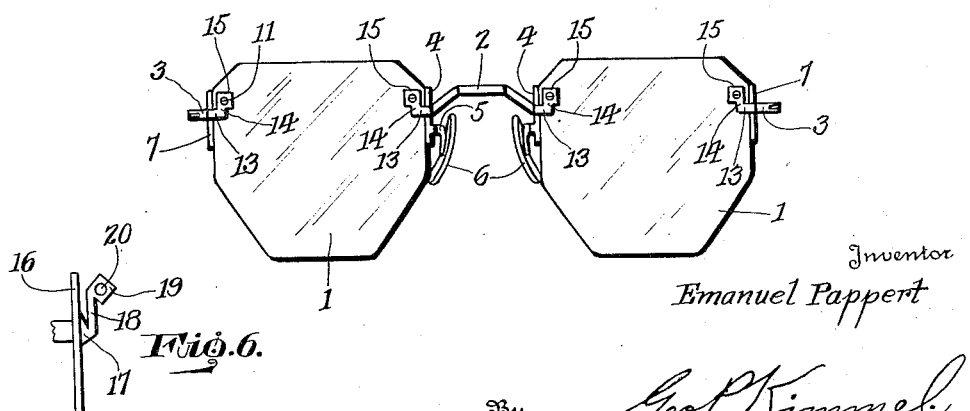
Inventor
*Emanuel Pappert*
By *Geo. P. Kimmel*
Attorney Patented Aug. 14, 1934

1,970,472

UNITED STATES PATENT OFFICE 1,970,472

LENS STRAP FOR SPECTACLES

Emanuel Pappert, Long Island City, N. Y., assignor to The Ful-Vue Sales Company, Washington, D. C.

Application June 17, 1933, Serial No. 676,354

3 Claims. (Cl. 88—47)

This invention has reference to spectacles and more particularly relates to an improved lens strap for rimless spectacle mountings.

Previously, the lens straps used in rimless spectacle mountings for securing the supporting members to the lenses of the rimless spectacles have consisted in general of a lens edge engaging portion to which the supporting member was attached and of a pair of strap ears adapted to extend from the lens edge engaging portion, at points adjacent the position of attachment of the support to the edge engaging portion, and to embrace the opposite faces of the lens. These lens straps in the past have been disposed so as to extend inwardly from the edge of the lens at substantially right angles thereto and in substantial alignment with the supporting member. It has been found, however, that when the lens straps are extended inwardly from the edge of the lens either in substantial alignment with the supporting member or at right angles with respect to the edge of the lens that they seriously interfere with the vision of many persons. This is so pronounced that in some cases it is impossible for a person to wear rimless spectacles of the type previously used.

Furthermore, the previously used type of spectacle mountings as above set forth have provided substantially no resistance against the twisting forces which are frequently exerted upon a spectacle while it is in use. Where the two strap arms extend directly inwardly from the edge of the lens, and a relatively slight twist is exerted upon the mountings, it is well known that a small three cornered piece of the lens will immediately break out thus not only rendering the spectacle unusable, but also involving the necessity for replacing the broken lens. This is always a very expensive proposition because of the accuracy and care with which the lenses must be ground.

It is, therefore, an object of this invention to provide a lens strap for the purpose above set forth in which the strap ears which many times offend the vision of spectacle wearers will be positioned above the level of the support for the spectacles, and hence more easily placed so that they will be out of the range of vision and out of the way when the spectacles are in use. It is an object to make those portions which are necessarily within the range of direct vision of the wearer relatively small as compared with the parts necessary to secure the lens straps to the opposite faces of the lens.

It is further an object of this invention to provide a device of the character set forth in which a substantially greater resistance will be offered to twisting stresses normally placed upon a spectacle mounting when used, whereby the breakage of lenses and the consequent inconvenience and great expense will be substantially reduced and a stronger structure will result.

Other objects and advantages of this invention will become apparent from the following description taken in connection with the accompanying drawing, it being distinctly understood that the same are by way of illustration and example only and are not to be taken as in any way limiting the spirit or scope of this invention. The spirit and scope of this invention is to be limited only by the prior art and by the terms of the appended claims.

Referring now more particularly to the drawing in which like numerals indicate corresponding parts throughout:

Figure 1 is a front elevation of a device embodying this invention.

Figure 2 is a top plan view of the device illustrated in Figure 1.

Figure 3 is a perspective view of the bridge embodied in the construction illustrated in Figures 1 and 2.

Figure 4 is an enlarged perspective of the end piece and temple connection of the device illustrated in Figures 1 and 2.

Figure 5 illustrates a slightly modified form of this invention.

Figure 6 is an enlarged view of a still further modified form of lens strap.

In Figure 1 the lenses 1 are connected together by means of a bridge 2 and are provided with the customary end pieces 3. At the opposite ends of the bridge 2 there are a pair of lens straps having elongated lens edge engaging portions 4 to which the ends of the bridge 2 are secured. Also secured to these lens engaging portions below the ends of the bridge are a pair of rearwardly extending arms 5 each of which is adapted to support at its rearward end a nose pad 6.

For the purpose of connecting the end pieces 3 to the lenses 1, each end piece is likewise provided with a lens edge engaging portion 7 which is similar to the lens edge engaging members 4. Both the bridge and the end pieces are secured to these edge engaging members at points intermediate their ends.

Extending upwardly and inwardly at an inclination with respect to the lens engaging portion 4 are a pair of relatively small arms 8 adapted to embrace the opposite faces of the lenses. Likewise, a pair of similar arms 9 extend at an inclination upwardly and inwardly from the lens engaging portion 7, both the arms 8 and the arms 9 being secured to the respective lens edge engaging members at points adjacent the position at which the bridge or the end piece is secured to such member. At its upper and inner end, each of these arms is provided with an enlarged terminal portion 10 which is shown as being perforated for the purpose of receiving a screw 11 or other means for securing the lens strap ears to the opposite faces of the lens 1.

It will thus be seen that a firm and secure mounting has been provided for the bridge 2 and for the end pieces 3 carrying the temples 12. The arms 8 and 9, extending from a point a substantial distance below the top ends of the lens edge engaging members 4 and 7 respectively, form long bearing portions, thus effectively increasing the amount of surface and contact with the opposite faces of the lens so as to take up for any torsional strain which might be introduced during the use of the spectacle. At the same time, the arms 8 and 9 are made relatively small with respect to the necessary size of the enlarged terminal portions 10, and the enlarged portions 10 are placed high with respect to the normal position of the supporting means for the lenses. By this arrangement, the field of vision of the wearer is left comparatively clear and there is much less likelihood of interference with the wearer's vision by the lens strap ears.

With reference more particularly to Figure 5, the strap ears are here shown as being of slightly modified form. In this instance, the arms which extend from the lens edge engaging portions are formed first with a portion extending inwardly substantially at right angles to the lens edge engaging portions, secondly with a portion 14 extending upwardly in a direction substantially parallel to the lens edge engaging portions, and third with an enlargement 15 extending inwardly from the upper end of the upwardly extending portion 14. It will be seen that the enlarged terminal portion 15 in this instance is formed with straight sides so as to produce a larger bearing surface on the respective faces of the lenses, and at the same time produce a more ornamental effect.

In Figure 6, the edge engaging portion 16 is substantially the same as in the previously described forms. The strap ears however are formed with a widened portion 17 where they are joined to the portion 16. Extending upwardly from the inner end of this widened portion is a slenderized arm 18 carrying the enlargement 19 at its upper end. This enlargement 19 is provided with a perforation 20 therein for the purpose of receiving a screw. The widened portion 17 enables a firmer attachement of the arms to the portion 16 and at the same time furnishes a greater bearing surface for engaging the face of the lens without unduly obstructing the field of vision.

It will be apparent from the above description that a device has been provided for carrying out all of the objects and advantages of this invention in a novel and highly desirable manner. It will be appreciated, however, that various changes and modifications may be made in the details and arrangement of parts without departing from the spirit or scope of the invention as set forth in the appended claims.

What I claim is:—

1. A spectacle mounting comprising a supporting member, an elongated lens edge engaging member secured at a point below its upper end to said supporting member, a pair of lens strap ears extending inwardly and upwardly from points in horizontal alignment with the end of said supporting member and having their innermost extremities positioned above the level of their points of juncture with said lens edge engaging portion and above the level of the end of said supporting member, and means for securing said strap ears to the opposite faces of a lens.

2. A spectacle mounting comprising a supporting member, an elongated lens edge engaging member secured at a point intermediate its ends to said supporting member, a pair of lens strap ears extending at an inclination inwardly and upwardly from points in horizontal alignment with the end of said supporting member and having their innermost portions positioned above the level of their points of juncture with said lens edge engaging portion and above the level of the end of said supporting member, and means for securing said strap ears to the opposite faces of a lens.

3. A spectacle mounting comprising a supporting member, an elongated lens edge engaging member secured at a point intermediate its ends to said supporting member, a pair of lens strap ears each having a portion substantially at right angles to said edge engaging member adapted to extend inwardly along the face of a lens from a point adjacent the end of said supporting member, a portion substantially parallel to said edge engaging member adapted to extend upwardly along the face of a lens, and a terminal portion extending inwardly from said upwardly extending portion, and means for securing said terminal portions to the opposite faces of a lens.

EMANUEL PAPPERT.